(12) United States Patent
Jaeger et al.

(10) Patent No.: US 8,212,642 B2
(45) Date of Patent: Jul. 3, 2012

(54) TRANSPONDER SYSTEM

(75) Inventors: Thomas Jaeger, Mauerstetten (DE); Peter Wiese, Kempfen (DE)

(73) Assignee: Pro-micron GmbH & Co. KG Modular Systems, Kaufbeuren (DE)

( * ) Notice: Subject to any disclaimer, the term of this patent is extended or adjusted under 35 U.S.C. 154(b) by 791 days.

(21) Appl. No.: 11/718,131

(22) PCT Filed: Oct. 18, 2005

(86) PCT No.: PCT/DE2005/001859
§ 371 (c)(1),
(2), (4) Date: Dec. 7, 2009

(87) PCT Pub. No.: WO2006/045274
PCT Pub. Date: May 4, 2006

(65) Prior Publication Data
US 2011/0018667 A1    Jan. 27, 2011

(30) Foreign Application Priority Data
Oct. 28, 2004   (DE) .................... 20 2004 016 751 U

(51) Int. Cl.
*H01F 21/04* (2006.01)
*H01F 21/02* (2006.01)

(52) U.S. Cl. .................... 336/115; 336/116; 336/145

(58) Field of Classification Search ............... 336/130, 336/131, 132, 145, 115, 116, 117, 118, 122, 336/123
See application file for complete search history.

(56) References Cited

U.S. PATENT DOCUMENTS

| | | | | |
|---|---|---|---|---|
| 4,587,486 A * | 5/1986 | Soyck | ........................... | 324/236 |
| 5,198,647 A * | 3/1993 | Mizuta | ........................... | 235/449 |
| 5,467,718 A * | 11/1995 | Shibata et al. | ................. | 104/284 |
| 5,698,840 A | 12/1997 | Jurisch et al. | | |
| 5,898,300 A * | 4/1999 | Heizmann et al. | ......... | 324/207.12 |
| 6,371,380 B1 | 4/2002 | Tanimura | | |
| 6,891,460 B2 * | 5/2005 | Tezuka et al. | ................. | 336/130 |
| 7,205,899 B2 | 4/2007 | Surkau | | |
| 2004/0017321 A1 | 1/2004 | Benedict et al. | | |
| 2005/0285470 A1 * | 12/2005 | Itoh et al. | ....................... | 310/208 |

FOREIGN PATENT DOCUMENTS

| | | |
|---|---|---|
| DE | 196 10 284 | 8/1997 |
| DE | 199 24 830 | 11/2000 |
| EP | 1 445 730 | 8/2004 |
| JP | 2002-298095 | 10/2002 |
| WO | WO 03/067512 | 8/2003 |

* cited by examiner

*Primary Examiner* — Anh Mai
(74) *Attorney, Agent, or Firm* — Collard & Roe, P.C.

(57) ABSTRACT

The invention relates to a transponder system for the contactless inductive power transmission of a stationary part having at least one read coil (2) disposed on the stator (1) to a rotating part having at least one transponder coil (4) disposed on a spindle (3). The aim of the invention is to provide a transponder system of the aforementioned kind which can be used for self-sufficient sensor applications even in the vicinity of metal materials and noise fields caused by electric motors conventional in mechanical engineering. For this purpose, the surrounding (5) of the read coil (2), especially the stator is produced from a material having little magnetic permeability and good electrical conductivity, preferably aluminum. The transponder coil (4) and/or the read coil (2) are disposed as flat coil (6) on the inside and/or outside of a cylindrical periphery (9, 10) of the stator and/or rotor (11). A layer (17, 18) of a material having high magnetic permeability is provided between the flat coil (8) and the rotor (11) or stator (1), preferably in the form of a foil of an amorphous ferritic material (17) or of a non-conducting ferritic metal (18).

15 Claims, 6 Drawing Sheets

TRANSPONDER SYSTEM

CROSS REFERENCE TO RELATED APPLICATIONS

Figure 1:
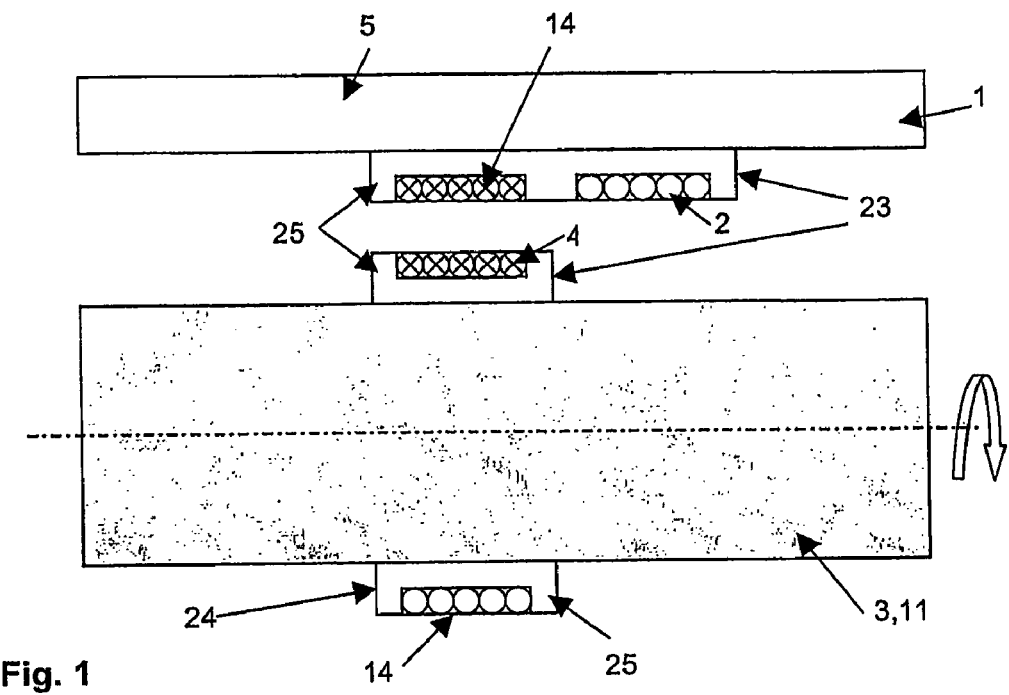

This application is the National Stage of PCT/DE2005/001859 filed on Oct. 18, 2005 which claims priority under 35 U.S.C. §119 of German Application No. 20 2004 016 751.4 filed on Oct. 28, 2004. The international application under PCT article 21(2) was not published in English.

The invention relates to a transponder system for the contactless inductive power transmission from a stationary side with at least one read coil arranged on the stator to a rotating side with at least one transponder coil arranged on a spindle. Such transponder systems are becoming more important in daily life. They are used in a passive variant as identification and storage media, or in an active variant for the purpose of processing sensor data. Wireless data communication permits the bidirectional exchange of useful and control information. Miniaturized autonomic measurement systems can be implemented in the technical field. A multiplicity of transponder circuits and systems have meanwhile become available on the market.

An example of such a transponder system is disclosed in DE 199 24 830. This arrangement serves for measuring temperature and air pressure, and for monitoring the wear of vehicle tires. The measurement of temperature and pressure is performed by means of an electronic transponder that is vulcanized into the tire wall and, upon request from the transceiver, transmits the measured values inductively with the aid of a digital carrier frequency method via a flat coil, radially integrated in the tire wall, as transponder coil to a transceiver mounted on the vehicle with the aid of a transmit coil. The transponder is known to consist of one or a few silicon chips on which there are integrated a temperature sensor and micromechanical pressure sensor together with a microprocessor and associated evaluation and transmission electronics, as well as a few external components. Communication is performed between transceiver and transponder in carried digital form, the transceiver emitting a command to the transponder which responds to this command, for example by carrying out the measurement, compensation—and linearization of the measured values and transmitting the measured data and/or further data stored in the transponder.

It is also no longer possible to imagine machining tool engineering without sensors for process monitoring or actuators for process optimization. The measuring sensors are chiefly mounted wherever effective contact can subsequently also be made with them. The result of this is, for example, that physical characteristics on the rotor can be measured only indirectly at the stator in the case of rotating components such as a spindle. Wireless transmission methods are certainly adequately known, but there is demand that such systems must operate autonomously in mechanical engineering. Thus, in addition to data transmission there is power coupling, which is preferably to be implemented inductively. Known methods such as, for example, the use of transponder technology cannot, however, be easily adapted, because the special requirements of mechanical engineering are not adequately taken into account in the development of such systems.

For example, signal interference that substantially complicates data transmission occurs as a consequence of eddy current losses and other parasitic effects. Added to this are complex variations in capacitance and resistance as well as fluctuations in inductance in the field of data transmission that are caused by geometry and material.

For the purpose of avoiding such interference, there is known from DE 196 10 284 an antenna coil with at least one coil turn in the case of which one side of the coil is provided with a conductive shield that substantially covers the region of the conductor loop and forms an open loop. The aim of this is to reduce the influence of electrical interference fields. The influences of magnetic interference fields can also be suppressed by bridging the interruption in the shield by means of a frequency-selective circuit.

The materials in the direct environment play an important role in the design of an inductively coupled system. For example, the complex impedance of a coil varies as a function of the frequency and of the magnetic and electrical characteristics of the material. The applied alternating field generates in the material eddy current losses that make it difficult to couple in power onto rotating systems. An important feature in an inductively coupled system is the coupling of the coils, it being necessary to aim at achieving as high a coupling factor as possible. Consequently, it holds true that the higher the quality of the resonant circuit, the smaller the required current in the secondary coil, because the losses decrease. For practical applications, powers of, for example, 10 mW at 5 volts are typical in the transponder coil, but this occasions a current of 170 mA in the read coils.

It is an object of the invention to modify the generic transponder system such that the environment of the read coil, in particular the stator, is produced from a material of good electrical conductivity and low magnetic permeability, preferably from aluminum, and/or a layer made from a highly magnetically permeable material is provided in the region of the transponder coil in the inner periphery of the stator.

This object is achieved in the case of a generic transponder system by virtue of the fact that the environment of the read coil, in particular the stator, is produced from a material of good electrical conductivity and low magnetic permeability, preferably from aluminum.

For example, a stator made from aluminum has essentially two effects. Firstly, the inductance of the transponder coil is reduced. The reason is for this is the eddy current losses in the aluminum, which has good electrical conductivity. However, against expectations the coil impedance, and thus the power loss are surprisingly likewise significantly reduced. This measure advantageously raises the quality of the transponder coil, and thus also the power transmission between the stationary and rotating sides. Owing to the better quality of the parallel resonance circuit, the power consumption and the voltage raise at resonance is substantially better than without an aluminum stator. It follows that a lesser current is required in the read coil in the case of a targeted fixed power of the transponder coil. The current density therefore drops such that the read coil can also advantageously have smaller dimensions.

The coils can be produced with an advantageously lesser outlay when the transponder coil and/or read coil are/is designed as a flat coil. Moreover, such flat coils require little volume. These can also advantageously be rectrofit subsequently on existing machines.

An advantageously high magnetic flux is attained when the read coil is designed as a coil wound around a U-shaped core. The outlay on production is low, since such coils are available as standard on the market.

It is particularly easy to fit the coils when the transponder coil and/or read coil are/is arranged as a flat coil inside and/or outside on a cylindrical periphery of the stator and/or rotor.

A particularly good coupling between the coils can be attained when the transponder coil and/or read coil are/is arranged on the inside and/or outside on an end face of the stator and/or rotor. However, it is a disadvantage of this mode of installation that there is a need for a free shaft end. Coils with a ferrite pot core are to be recommended as particularly advantageous for this type of installation. The advantageously good coupling therefore results on the basis of the high magnetic flux.

The mounting of flat coils is substantially facilitated when the flat coil is equipped self-adhesively, preferably as a foil printed with conductors.

The overwhelming number of rotating shafts on which measurement is carried out are made from high-alloy MnCr steel or normal tool steels. To a surprisingly large extent, the power transmission between stationary and rotating parts can be improved when a layer of a highly magnetically permeable material is arranged, preferably as a foil made from an amorphous metal or a non-conductive ferritic metal, between the flat coil and rotor or stator. This effect is explained by virtue of the fact that the magnetic flux is conducted through the ferrite with the result that fewer parasitic eddy currents occur in the surrounding metallic material.

It already suffices when the layer of the highly permeable material is between 0.01 mm and 1 mm thick.

It is advantageous in this case when the read coil is of wider design than the transponder coil. It is mostly sufficient for the purpose of supplying the microsystems when the transport coil is, for example, 3 mm wide in the axial direction of the spindle, and the read coil wound onto a ferritic U-shaped core is, for example, 20 mm wide in total.

An advantageously uniform power transmission is achieved from the fact that the flat coil is designed, preferably with multiple plies, as a rotationally symmetrical planar coil. The inductances and numbers of turns per unit length can easily be adapted to what is required in the individual case by means of planar coils of multiple plies. The transponder coil can thus advantageously be adapted to the required supply voltage of the microsystem and the load resistance.

It is particularly easy to adapt the transponder coil when the flat coil is formed from a foil tape with substantially parallel conductors and which can be cut to length as desired, the conductor ends being joined and brought into contact in a fashion offset by a conductor spacing to form a coil in the manner of a tape bent to form a cylinder.

In a refinement where the flat coil is arranged in an annular groove of the spindle and/or of the stator, the coils are advantageously mounted with protection and their axial position is fixed. They can also not be displaced while vibrating.

A suitable selection of the material for the layer between the coil and its metallic environment is attained when the highly permeable foil has a permeability that is higher than that of a material of the spindle and/or of the stator that surrounds the coil.

In a particularly advantageous refinement, it is provided that the spindle consists of steel, in particular a CrMn steel, and a transponder coil, preferably designed as a rotationally symmetrical flat coil, is arranged on a layer of amorphous metal. This combination has yielded the best power transmission in experiments. It was possible with this measure to reduce the current in the read coil to ⅕.

An advantageously good coupling results for the system particularly in the case of a combination where the stator consists of aluminum, and a transmit coil, preferably designed as a rotationally symmetrical flat coil, is arranged on a layer of ferrite foil.

This coupling can be further improved in specific cases when a layer of a material of good electrical conductivity, preferably copper, is arranged between the stator and/or the rotor and the ferrite foil.

Finally, it is advantageously provided that the read coil is wound on a ferrite core and, a layer provided in the inner periphery of the stator, of a highly permeable material or of ferritic material is designed in an intermittent fashion in the region of the read coil.

Figure 3:
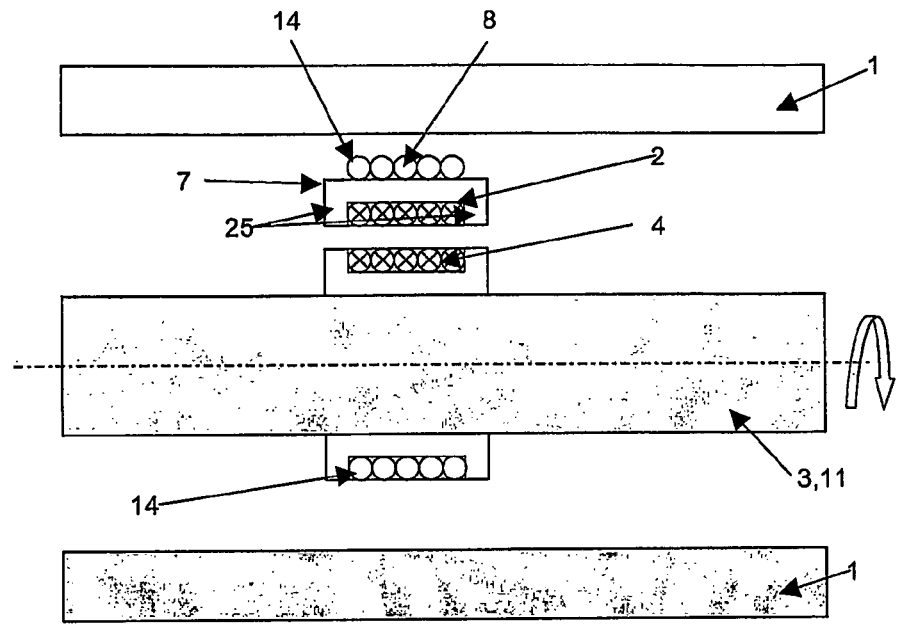
Figure 4:
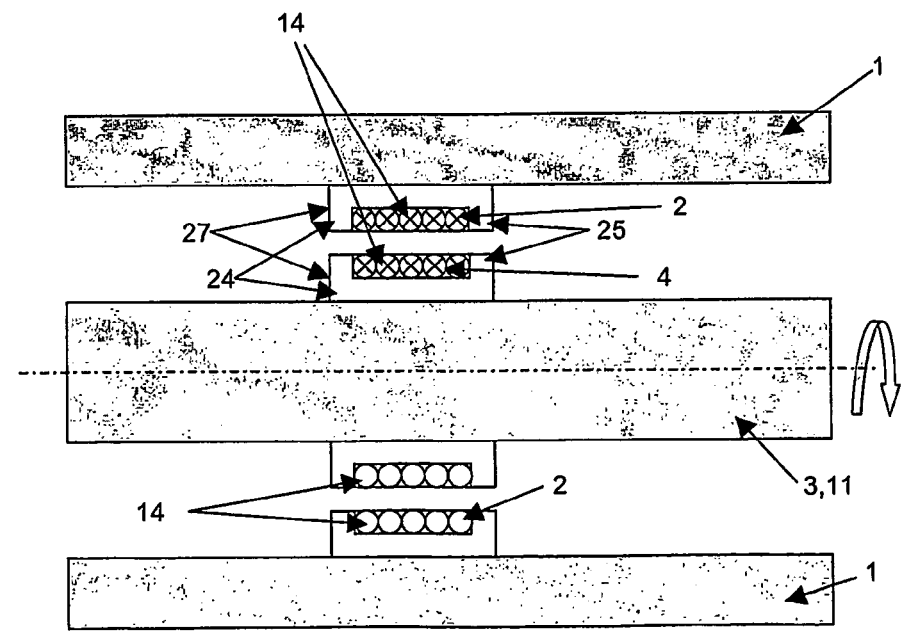
Figure 5:
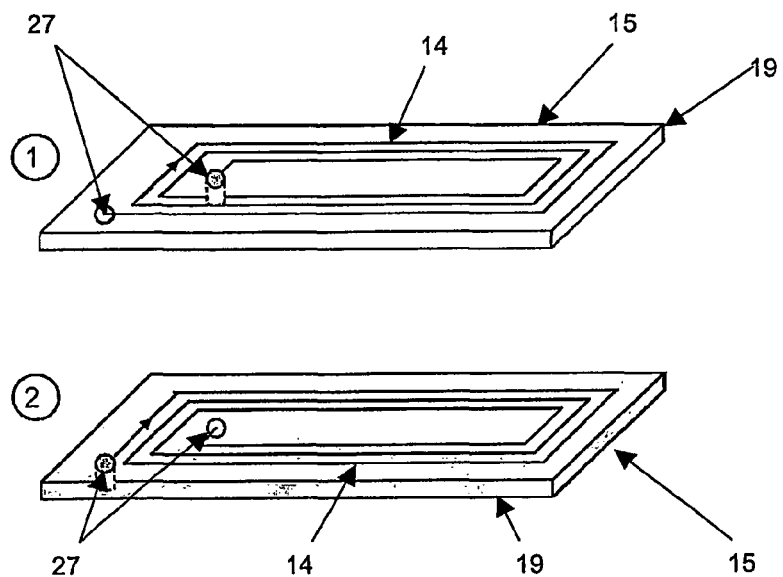
Figure 6:
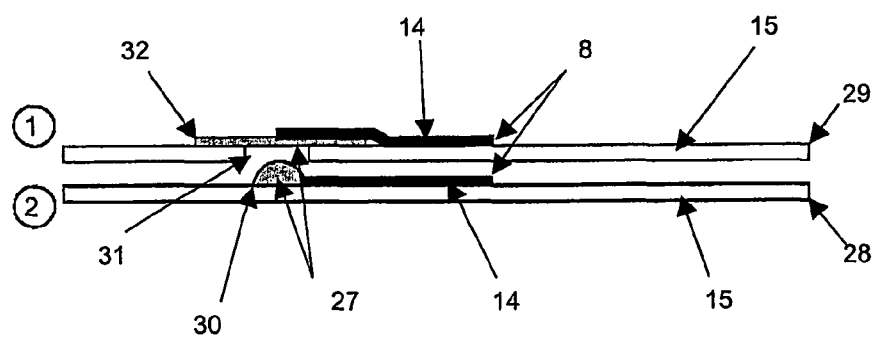
Figure 7:
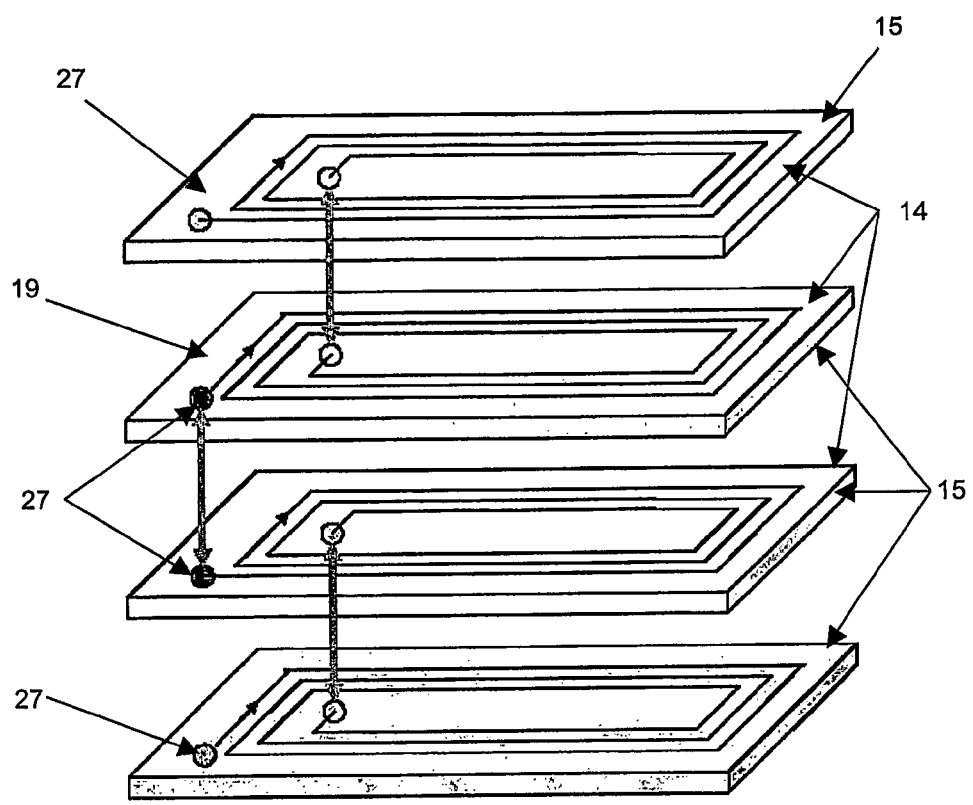
Figure 8:
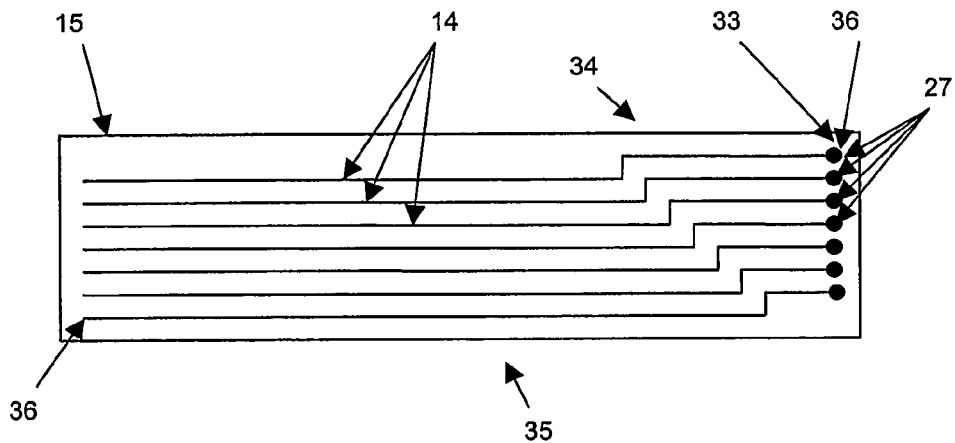
Figure 9:
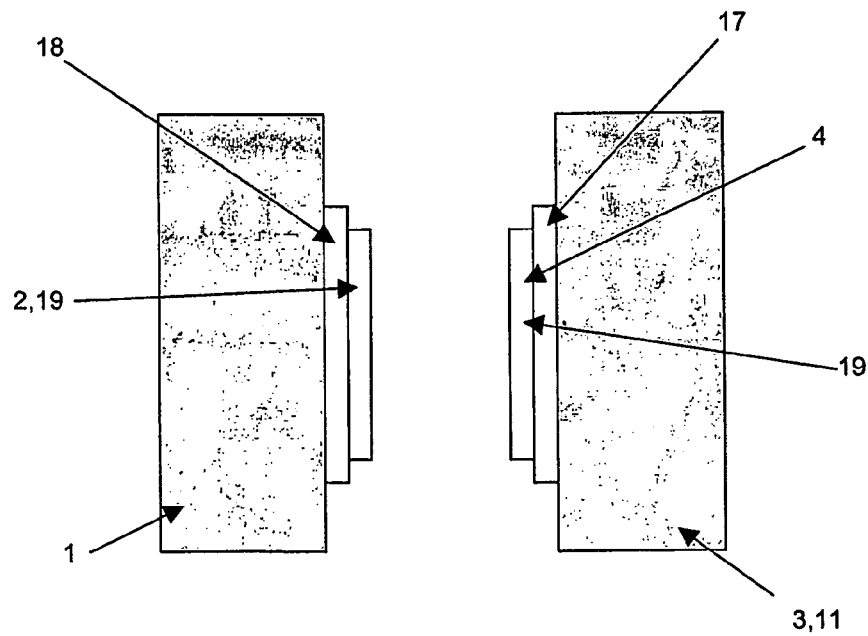
Figure 10:
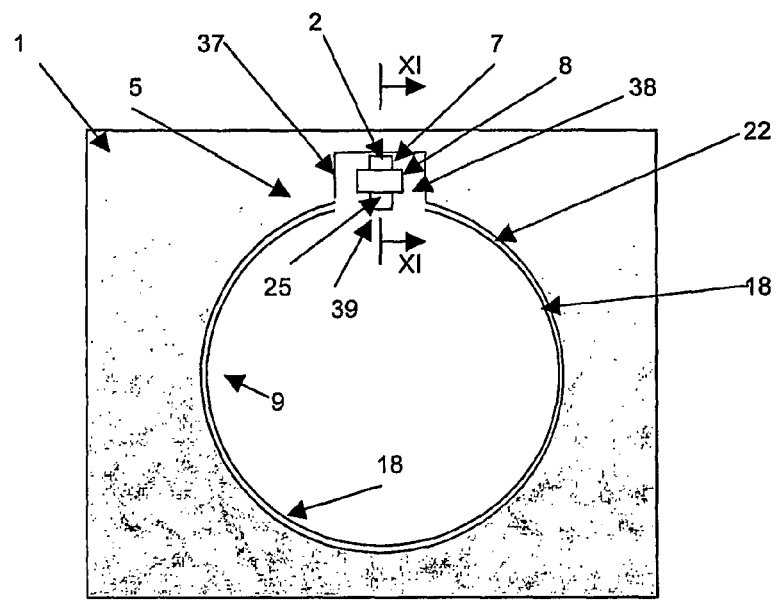
Figure 11:
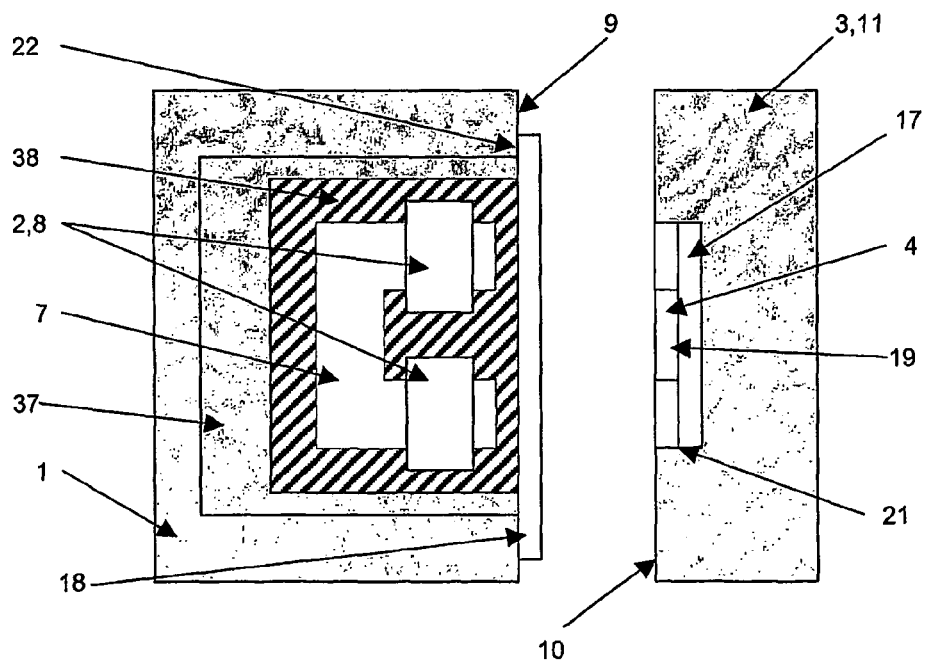

The invention will now be explained with reference to a preferred exemplary embodiment and with the aid of a drawing, identical reference numerals characterizing the same parts in terms of function. In detail, the figures of the drawing are as follows:

FIGS. 1 to 4: are schematics of a selection of different configurations of transponder and read coils, FIG. 5 is a schematic of a planar coil multiple plies, FIG. 6 shows a vertical section through a planar coil with multiple plies in the region where contact is made, FIG. 7 shows an alternative embodiment of a planar coil with multiple plies, FIG. 8 shows a plan view of a foil for producing a planar coil, FIG. 9 shows a vertical section through a schematic of a transponder/read coil arrangement, FIG. 10 shows an alternative embodiment of a transponder/read coil pairing in a horizontal section, and FIG. 11 shows an illustration of a detail in vertical section in accordance with the line of section XI-XI in FIG. 10.

FIGS. 1 to 4 are schematics of different configurations of read and transponder coils.

In FIG. 1, a read coil 2 wound on a shell-shaped or E-shaped ferrite core 23 is situated opposite a transponder coil 4 wound in a rotationally symmetrical fashion. The transponder coil is illustrated in this case with its conductor 14 as a coil former wound on an annular core 24 with a u-shaped cross section.

The free legs 25 of the U-profile are in this case situated opposite the middle and the outer leg 25 of the E-shaped ferrite core 23.

Figure 2:
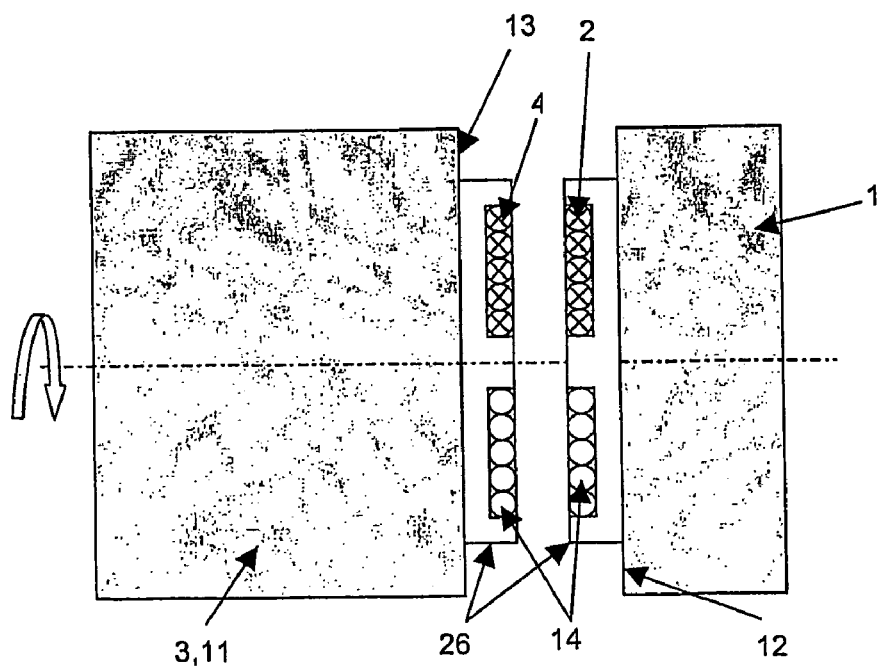

A rotationally symmetrical axial variant is illustrated in FIG. 2. The transponder coil 4 is fastened in this case on the end face 13 of the rotor 11, while the laser coil 2 is fastened coaxially on the end face 12 of the stator 1. The two conductors of the read and transponder coil, respectively, are wound around the middle pin of the ferrite shell core 26 situated opposite.

The arrangement in FIG. 3 corresponds in principle to the arrangement illustrated in FIG. 1, although the stator 1 encloses the rotor 11, and instead of a shell or E-ferrite coil 23 the read coil 2 has a U-shaped ferrite coil around which the conductor of the read coil is wound. In this case, the conductor is wound around the base of the U-shaped core. However, it can also be wound around the two free legs 25.

FIG. 4 shows a pairing of two rotationally symmetrical coils opposite one another, specifically the read coil 2 and the transponder coil 4. Both coil formers 27 are designed as annular cores 24 with U-shaped cross sections, although the free ends of the legs 25 are situated opposite one another.

Instead of the annular cores shown in FIGS. 1 to 4, the transponder coils shown there can be implemented advantageously in terms of production engineering in the form of planar coils, as shown in FIG. 5. In each case, a part of the conductor 14 is applied to a foil 15, thus resulting in a part of the planar coil 19. The contacts 27 are applied to the opposite surface of the foil 15. The next ply is fitted with congruent contacts that are, however, located on the respectively opposite side of the other ply such that when coincidence is brought about a contact of one ply makes contact with the other corresponding contact of the other ply, and the other two contacts are available for making external contact. In one ply, the current then flows from outside inward, and the flow in the other ply is opposite when the conductor 14 of the planar coil of each level is of spiral design. This planar coil can be used both as read coil and as transponder coil. However, it does not form a rotationally symmetrical coil when it is laid around the spindle. The transmission of power is performed more uniformly the greater the periphery covered by the planar coil in the stator or on the rotor.

FIG. 6 is a schematic vertical section illustrating one possibility for the contact between the two plies of planar coils. Formed as contact bump 30 on the lower ply 28 of the planar coil is the contact 27 that penetrates an opening 31 situated opposite when the two plies 28 and 29 are pressed onto one another, and achieves the contact surface 32. Bump 30 can then be connected to surface 32 using suitable methods.

Virtually any desired number of planar coils can be arranged one above the other in this way, as shown by way of example in FIG. 7.

It is possible to implement in a particularly cost effective way a planar coil with a plurality of conductors 14 arranged next to one another on a foil 15, for example as shown in FIG. 8. By suitable conductor guidance in the region 34, the individual contacts 27 on the end 33 are offset with respect to the conductors 14 in the region 35 by a conductor spacing such that the conductors are combined to form a winding after a suitable contact has been made in the case of wrapping, for example of the rotor. At its diagonally opposite ends, the coil has in each case a winding end 36 that makes external contact. Such a foil can also be used for different diameters by being appropriately cut to length.

FIG. 9 illustrates an arrangement of read and transponder coils by means of planar coils 19, as it corresponds to the configuration shown in FIG. 4.

Here, the stator 1 is preferably produced from a material of good electrical conductivity, for example aluminum. Provided between the read coil 2 and the stator 1 is a layer 18 that preferably consists of a ferrite material, in particular a ferrite foil 0.2 mm thick, such as is marketed by Epcos with the designation F96. A thin copper layer, for example 0.05 mm thick, can further be provided between foil and rotor. The read coil 2 is preferably produced as a rotationally symmetrical coil that is connected at a suitable point in a known way to the write/read unit. Situated opposite said read coil 2 is the transponder coil 4, which is likewise designed as a rotationally symmetrical planar coil 19. Provided between said transponder coil and the rotor 11, which mostly consists of a tool steel and is thus usually a machine tool spindle 3, is a layer 17 which is 0.025 mm thick and made from a highly permeable material, specifically consisting of an amorphous soft magnetic metal, for example the material marketed by Vakuumschmelze Hanau with the designation Vitrovac.

FIG. 10 shows a plan view of a horizontal section with an alternative embodiment of the read coil 2, in the case of which the coil 8 is wound on a U-shaped ferrite core 7, specifically onto the free legs 25 of the core 7. The read coil 2 is located in this case in a housing 37 made from aluminum, and is fixed therein by a potting compound 38. The environment 5 of the read coil 2 can also be formed by another customary material, such as structural steel. However, said environment 5 is likewise preferably made from aluminum. The inner periphery 9 of the stator 1 is lined by the abovementioned layer 18 in the region of the read coil 2 in the form of a tape. However, the tape is interrupted in the region 39 of the read coil 2.

FIG. 11 shows a vertical section as a detail in accordance with the line of section XI-XI in FIG. 10. The interrupted ferrite layer 18 additionally has a layer 22 that is a good conductor, for example being made from copper, on its side facing the stator 1. The rotationally symmetrical transponder coil 4, which is substantially narrower in the axial direction, is arranged in an annular groove 21. The highly permeable soft magnetic layer 17 already mentioned above is provided between the transponder coil 4, designed as a planar coil 19, and the rotor 11. The layer 17 is wider than the axial dimension of the transponder coil 4.

It is possible in this way to implement in a particularly cost effective fashion adequate powers for a microchip and sensors having known evaluation and transmission electronics such as are customary with the present day transponder systems. Typical dimensions in this case are an axial extent of 6 mm, for example, for the transponder coil, while the layers provided between rotor and stator have an axial extent of 7 mm, for example. It suffices when the ferritic layer has a thickness of 0.2 mm, for example, and the highly permeable layer a thickness of 0.025 mm. The thickness of such planar coils is approximately 0.1 mm. Such coils are operated at a frequency of approximately 125 kH.

Appropriate adaptations should be made at other frequencies that are used by such transponder systems. It is possible in this way to illustrate coil pairings that deliver a surprisingly high quality even in the case of the metallic environment customary in mechanical engineering. The transponder coil is to be adapted to the load. Because of the inventive measures, a transmit coil with small dimensions suffices to provide the microsystem on the rotor. Typical dimensions of the transmit coil are 25×25×25 mm. Of course, it is also possible to combine a plurality of coils in one system at a time.

The coils are preferably operated in series resonance, a particularly good power transmission being possible between the stationary and moving parts. The measures described effect an improvement by a factor of more than 10 in contrast with air coils.

LIST OF REFERENCE NUMERALS

1 Stator
2 Read coil
3 Spindle
4 Transponder column
5 Environment
6 Flat coil
7 Core, u-shaped
8 Coil
9 Periphery, stator
10 Periphery, rotor
11 Rotor
12 End face, stator
13 End face, rotor
14 Conductor
15 Foil
16
17 Amorphous, soft metallic metal layer
18 Ferritic, electrically nonconductive metal layer
19 Planar coil, rotationally symmetrical
20 Foil tape
21 Annular groove
22 Copper layer
23 Ferrite core
24 Annular core
25 Limb
26 Ferrite pot core
27 Contacts
28 Lower ply
29 Upper ply
30 Contact bump 31 Opening
32 Contact surfaces
33 End
34 Region
35 Region
36 Winding end
37 Housing
38 Potting compound
39 Region

The invention claimed is:

1. A transponder system for contactless inductive power transmission from a stationary side with at least one read coil arranged on a stator to a rotating side with at least one transponder coil arranged on a rotor, the rotor comprising a spindle,
wherein at least one of the at least one transponder coil and the at least one read coil is designed as a flat coil, and
wherein a layer of a highly magnetically permeable material is arranged between the rotor and the stator in a region of the at least one transponder coil in an inner periphery of the stator.

2. The transponder system as claimed in claim 1, wherein the at least one read coil is wound around a U-shaped core.

3. The transponder system as claimed in claim 1, wherein the flat coil is inside and/or outside on a cylindrical periphery of the stator and/or rotor.

4. The transponder system as claimed in claim 1, wherein the at least one transponder coil and/or the at least one read coil are/is arranged on the inside and/or outside on an end face of the stator and/or rotor.

5. The transponder system as claimed in claim 1, wherein the flat coil is equipped self-adhesively.

6. The transponder system as claimed in claim 1, wherein the layer of the highly magnetically permeable material is between 0.01 mm and 1 mm thick.

7. The transponder system as claimed in claim 1, wherein the at least one read coil is of wider design than the at least one transponder coil.

8. The transponder system as claimed in claim 1, wherein the flat coil is designed as a rotationally symmetrical planar coil.

9. A transponder system for contactless inductive power transmission from a stationary side with at least one read coil arranged on a stator to a rotating side with at least one transponder coil arranged on a spindle,
wherein at least one of the at least one transponder coil and the at least one read coil is designed as a flat coil,
wherein the flat coil is formed from a foil tape with substantially parallel conductors, the foil tape being able to be cut to length as desired, conductor ends of the substantially parallel conductors being joined and brought into contact in a fashion offset by a conductor spacing to form a coil in the manner of a tape bent to form a cylinder, and
wherein:
the stator forms an environment of the at least one read coil and the stator is produced from a material of good electrical conductivity and low magnetic permeability, and/or
a layer made from a highly magnetically permeable material is provided in a region of the at least one transponder coil in an inner periphery of the stator.

10. A transponder system for contactless inductive power transmission from a stationary side with at least one read coil arranged on a stator to a rotating side with at least one transponder coil arranged on a spindle,
wherein at least one of the at least one transponder coil and the at least one read coil is designed as a flat coil,
wherein the flat coil is arranged in an annular groove of the spindle and/or of the stator, and
wherein:
the stator forms an environment of the at least one read coil and the stator is produced from a material of good electrical conductivity and low magnetic permeability, and/or
a layer made from a highly magnetically permeable material is provided in a region of the at least one transponder coil in an inner periphery of the stator.

11. A transponder system for contactless inductive power transmission from a stationary side with at least one read coil arranged on a stator to a rotating side with at least one transponder coil arranged on a spindle,
wherein a layer made from a highly magnetically permeable material is provided in a region of the at least one transponder coil in an inner periphery of the stator,
wherein the highly magnetically permeable layer has a first permeability,
wherein a material of the spindle and/or of the stator has a second permeability, and
wherein the first permeability is greater than the second permeability.

12. A transponder system for contactless inductive power transmission from a stationary side with at least one read coil arranged on a stator to a rotating side with at least one transponder coil arranged on a spindle,
wherein the spindle comprises a CrMn steel, and
wherein the at least one transponder coil is arranged on amorphous metal.

13. A transponder system for contactless inductive power transmission from a stationary side with at least one read coil arranged on a stator to a rotating side with at least one transponder coil arranged on a rotor, the rotor comprising a spindle,
wherein a layer made from a highly magnetically permeable material is provided in a region of the at least one transponder coil in an inner periphery of the stator,
wherein the stator comprises aluminum, and
wherein the at least one read coil is arranged on a layer of ferrite foil.

14. The transponder system according to claim 13, further comprising a layer of a material of good electrical conductivity arranged between the stator and/or the rotor and the layer of ferrite foil.

15. A transponder system for contactless inductive power transmission from a stationary side with at least one read coil arranged on a stator to a rotating side with at least one transponder coil arranged on a spindle,
wherein the at least one read coil is wound on a ferrite core, and
wherein a layer of a highly permeable material or of ferritic material is provided in an inner periphery of the stator and is designed in an intermittent fashion in a region of the at least one read coil.

* * * * *